United States Patent
Ma et al.

(10) Patent No.: US 11,085,661 B2
(45) Date of Patent: Aug. 10, 2021

(54) FLUID INJECTION CONTROL SYSTEM AND FLUID CIRCULATION SYSTEM

(71) Applicant: Danfoss (Tianjin) Ltd., Tianjin (CN)

(72) Inventors: He Ma, Beijing (CN); Li Yao, Tianjin (CN); Zhiwei Shang, Tianjin (CN); Guocun Li, Tianjin (CN); Luigi Zamana, Aachen (DE)

(73) Assignee: DANFOSS (TIANJIN) LTD., Tianjin (CN)

( * ) Notice: Subject to any disclaimer, the term of this patent is extended or adjusted under 35 U.S.C. 154(b) by 164 days.

(21) Appl. No.: 16/212,792

(22) Filed: Dec. 7, 2018

(65) Prior Publication Data
US 2019/0178513 A1   Jun. 13, 2019

(30) Foreign Application Priority Data
Dec. 8, 2017   (CN) .......................... 201711306378.4

(51) Int. Cl.
| | |
|---|---|
| *F24F 11/37* | (2018.01) |
| *F25B 31/00* | (2006.01) |
| *F24F 11/88* | (2018.01) |
| *F25B 49/02* | (2006.01) |

(Continued)

(52) U.S. Cl.
CPC .............. *F24F 11/37* (2018.01); *F24F 11/88* (2018.01); *F25B 31/006* (2013.01); *F25B 31/008* (2013.01); *F25B 49/005* (2013.01); *F25B 49/02* (2013.01); *F25B 49/027* (2013.01); *H02J 9/00* (2013.01); *F25B 2400/054* (2013.01); *F25B 2500/08* (2013.01); *F25B 2500/27* (2013.01); *F25B 2600/2515* (2013.01); *F25B 2700/21152* (2013.01); *F25B 2700/21156* (2013.01)

(58) Field of Classification Search
CPC .... B60H 2001/3294; B60H 2001/3292; B60H 1/00428
See application file for complete search history.

(56) References Cited

U.S. PATENT DOCUMENTS

| | | | |
|---|---|---|---|
| 9,441,861 B2 | 9/2016 | Diamond et al. | |
| 10,315,495 B2* | 6/2019 | Vehr | B60H 1/005 |
| 2003/0010046 A1 | 1/2003 | Freund et al. | |

(Continued)

FOREIGN PATENT DOCUMENTS

| | | |
|---|---|---|
| CN | 2556837 Y | 6/2003 |
| CN | 2859901 Y | 1/2007 |

(Continued)

OTHER PUBLICATIONS

Indian First Examination Report for Application No. 201814046414 dated Jun. 23, 2020.

*Primary Examiner* — Nelson J Nieves
(74) *Attorney, Agent, or Firm* — McCormick, Paulding & Huber PLLC

(57) ABSTRACT

A fluid injection control system, a fluid injection control method and a fluid circulation system including the fluid injection control system are provided. The fluid injection control system includes an injection valve, control apparatus and energy storage apparatus. The injection valve is arranged in a path along which a fluid flows into a device; the energy storage apparatus is configured to supply, in response to the control apparatus being powered off, power to the control apparatus so as to maintain an operation of the control apparatus.

20 Claims, 5 Drawing Sheets

(51) Int. Cl.
*F25B 49/00* (2006.01)
*H02J 9/00* (2006.01)

(56) References Cited

U.S. PATENT DOCUMENTS

| | | | | |
|---|---|---|---|---|
| 2018/0001739 A1* | 1/2018 | Vehr | ....................... | F25B 49/02 |
| 2018/0001744 A1* | 1/2018 | Vehr | ................... | B60H 1/3211 |
| 2018/0031282 A1* | 2/2018 | Woo | ....................... | F25B 41/062 |
| 2018/0357577 A1* | 12/2018 | ElBsat | .................. | G06Q 50/06 |
| 2020/0114733 A1* | 4/2020 | Vehr | .................. | B60H 1/00428 |

FOREIGN PATENT DOCUMENTS

| | | | | |
|---|---|---|---|---|
| CN | 201340557 Y | 11/2009 | | |
| CN | 102331124 A | 1/2012 | | |
| CN | 102606481 A | 7/2012 | | |
| CN | 102648383 A | 8/2012 | | |
| CN | 103375408 A | 10/2013 | | |
| CN | 103647342 A | 3/2014 | | |
| CN | 103701336 A | 4/2014 | | |
| CN | 104141999 A | 11/2014 | | |
| CN | 104728091 A | 6/2015 | | |
| CN | 102648383 B | 9/2015 | | |
| CN | 105402853 A | 3/2016 | | |
| CN | 106642856 A | 5/2017 | | |
| CN | 107787469 A * | 3/2018 | ............. | F24F 11/62 |
| CN | 207778882 U | 8/2018 | | |
| KR | 20030013025 A * | 2/2003 | ............. | F24F 11/62 |
| KR | 20110118679 A | 10/2011 | | |
| WO | 2017/203608 A1 | 11/2017 | | |

\* cited by examiner

FLUID INJECTION CONTROL SYSTEM AND FLUID CIRCULATION SYSTEM

CROSS-REFERENCE TO RELATED APPLICATIONS

Applicant hereby claims foreign priority benefits under U.S.C. § 119 from Chinese Patent Application No. 201711306378.4 filed on Dec. 8, 2017, the content of which is incorporated by reference herein.

TECHNICAL FIELD

Embodiments of the present disclosure generally relate to the control technologies, and particularly, to a fluid injection control system and a fluid circulation system with the control system.

BACKGROUND

In some process control systems, such as a refrigeration system, a compressor is generally used to compress a fluid such as a refrigerant and a lubricant from, for example, an evaporator, and to feed the compressed fluid into, for example, a condenser. When a load is increased, a running speed of the compressor needs to be increased to increase the flow of the fluid so as to meet the requirement of the load. With the increase in the running speed of the compressor, however, the temperature of the fluid discharged from the compressor will be increased accordingly, resulting in degradation in properties of the fluid. For example, the refrigeration property of the refrigerant or the lubricating property of the lubricant will be degraded, which will in turn lead to a reduction in efficiency of the compressor and a reduction in reliability and stability of the system. In order to ensure normal operation of the compressor and the system with the compressor, a controller may be used to control a liquid injection valve to inject the fluid outputted from an outlet of the condenser into the compressor directly, in order to reduce the temperature of the fluid discharged from the compressor.

If the controller is powered off, for example, if an insufficient or lower voltage is supplied to the controller or if power supply for the controller is interrupted, the controller could not continue to control the liquid injection valve. In order to prevent the liquid injection valve from keeping injecting the fluid to the compressor with an open degree before the controller is powered off, the system is generally provided with an additional solenoid valve to prevent the fluid such as a refrigerant from being injected into the compressor through the liquid injection valve. This control scheme will increase control complexity of the whole system and will also increase customers' costs for the solenoid valve, associated control circuit(s) and installation thereof.

SUMMARY

The present disclosure is to overcome or solve at least one aspect of the above-mentioned disadvantages or problems or other disadvantages or problems.

According to an aspect of the present disclosure, a fluid injection control system includes an injection valve, control apparatus and an energy storage apparatus; the injection valve is arranged in a path along which a fluid flows into a device, the energy storage apparatus is configured to supply, in response to the control apparatus being powered off, power to the control apparatus so as to maintain an operation of the control apparatus, and the control apparatus is configured to control, in response to the control apparatus being powered off, the injection valve to be closed.

In one embodiment, the control apparatus is further configured to control, in a state where the control apparatus is powered on, an open degree of the injection valve so as to control a flow of the fluid injected into the device through the injection valve.

In one embodiment, the fluid injection control system further includes a power-off detection circuit configured to detect a state of supplying power from an external power supply to the control apparatus, and to send a power-off signal to the control apparatus in response to supply of power from the external power supply to the control apparatus being off.

In one embodiment, the fluid injection control system further includes a valve drive circuit configured to control an open degree of the injection valve, and the control apparatus is further configured to send, in response to receiving the power-off signal, a valve closing signal to the valve drive circuit such that the valve drive circuit drives the injection valve to be closed.

In one embodiment, the valve drive circuit is configured to control a valve actuating mechanism to drive the injection valve to be opened at a controlled open degree or to drive the injection valve to be closed.

In one embodiment, the energy storage apparatus is further configured to continue, in response to the control apparatus being powered off, to supply power to at least one of the valve drive circuit and the valve actuating mechanism.

In one embodiment, the energy storage apparatus is electrically connected with an external power supply configured to supply power to the control apparatus.

In one embodiment, the energy storage apparatus includes a super capacitor or a rechargeable battery.

In one embodiment, the energy storage apparatus is in electrical connection with the control apparatus directly.

In one embodiment, the energy storage apparatus is electrically connected with the control apparatus by a switch, the switch being configured to, in response to the control apparatus being powered off, be switched on such that an electric energy from the energy storage apparatus is supplied to the control apparatus through the switch.

In one embodiment, the switch includes a diode or a MOS transistor.

In one embodiment, at least one of the energy storage apparatus and the power-off detection circuit is integrated into a same one controller where the control apparatus is located.

According to another aspect of the present disclosure, a fluid circulation system includes the fluid injection control system and the device described in any of the above embodiments of the present disclosure, and the fluid injection control system is configured to control injection of the fluid into the device.

In one embodiment, the device may be a compressor, the fluid circulation system further includes an evaporator and a condense. The compressor, the condenser and the evaporator are in a fluid communication with one another in sequence through a pipe so as to form a fluid circulation loop, and the injection valve is arranged in a path of the fluid flowing from an outlet of the condenser to the compressor.

In one embodiment, the fluid circulation system further includes a temperature detector, configured to detect a temperature of the fluid flowing out from an outlet of the device and to send a temperature signal indicative of the temperature to the control apparatus; the control apparatus is further configured to determine whether the temperature of the fluid flowing out from the outlet of the device exceeds a threshold based on the temperature signal, and to control, in response to the temperature exceeding the threshold, the injection valve to inject a fluid into the device so as to reduce the temperature of the fluid flowing out from the outlet of the device.

According to a further aspect of the present disclosure, a fluid injection control method includes steps of: controlling injection of fluid into a device by using the fluid injection control system described in any of the above embodiments of the present disclosure.

In one embodiment, the step of controlling injection of the fluid into the device by using the fluid injection control system includes:

detecting a state of supplying power from an external power supply to the control apparatus;

determining whether the control apparatus is powered off according to the detected state; and supplying power by the energy storage apparatus to the control apparatus in response to the control apparatus being powered off, such that the control apparatus controls the injection valve to be closed so as to prevent the fluid in the path from being injected into the device through the injection valve.

Advantages of the present disclosure will become apparent from the following description of the present disclosure with reference to the accompanying drawings,

BRIEF DESCRIPTION OF THE DRAWINGS

The above and other features of the present disclosure will be described in more details according to exemplary embodiments thereof with reference to the accompanying drawings, in which.

DETAILED DESCRIPTION

Exemplary embodiments of the present disclosure will be described hereinafter in detail with reference to the drawings, wherein the same or similar reference signs refer to the same or similar elements. The present disclosure may, however, be implemented in many different ways and should not be construed as being limited to the embodiment set forth herein.

In the following detailed description, for purposes of explanation, details are set forth in order to provide a thorough understanding of the disclosed embodiments. It will be apparent, however, that one or more embodiments may be practiced without these details. In other instances, well-known structures and devices are schematically shown in order to simplify the drawings.

According to an aspect of the present disclosure, a system having an injection valve for injecting a fluid into a device is provided with an energy storage apparatus, and the energy storage apparatus continues to supply power to the control apparatus in response to a situation in which control apparatus for controlling the injection valve is powered off, such that the control apparatus can control the injection valve to be off and to prevent the fluid from being injected into the device through the injection valve. Thereby, the fluid to the device is cut off without any additional solenoid valve in the system.

The following description of various embodiments of the present disclosure with reference to the drawings is intended to explain the present disclosure, and should not be regarded as limitation to the scope of the present disclosure.

Figure 1:
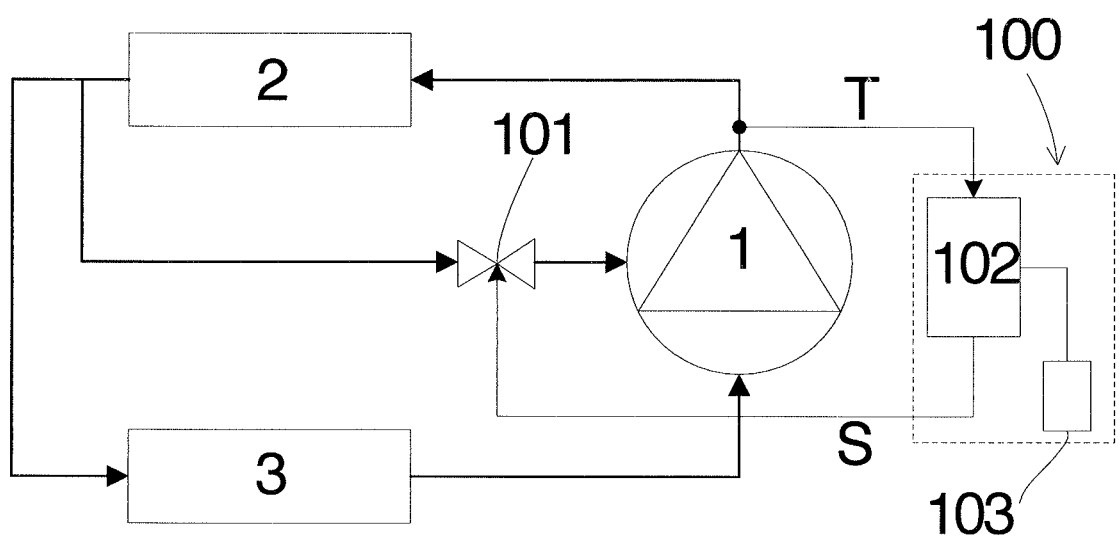
FIG. 1 is a schematic diagram showing a fluid circulation system according to an exemplary embodiment of the present disclosure.

FIG. 1 schematically shows a fluid circulation system according to an exemplary embodiment of the present disclosure. The fluid circulation system, may be, for example, a refrigeration or air-conditioning system, for circulating a fluid such as a refrigerant or lubricant through a loop. The fluid circulation system generally includes a plurality of devices which are arranged in the loop and which are in fluid communication with one another, such as devices 1, 2 and 3 shown in FIG. 1. Exemplarily, the device 1 may be a compressor, the device 2 may be a condenser, and the device 3 may be an evaporator. The compressor, the condenser and the evaporator are in a fluid communication with one another in sequence through pipes so as to form a fluid circulation circuit or loop. It can be understood that the present disclosure is not limited to such system, and the fluid circulation system may also include additional or alternative device(s) for circulating the fluid. Hereinafter, the fluid circulation system including the compressor 1, the condenser 2 and the evaporator 3 will be taken as an example for describing embodiments of the present disclosure in detail.

In a refrigeration or air-conditioning system, the compressor sucks a fluid (for example, a refrigerant) from the evaporator in communication therewith in time, compresses the low temperature and low pressure fluid into a high temperature and high pressure fluid, and discharges the high temperature and high pressure fluid to the condenser; the condenser, as a heat exchange device, enables heat exchange between the high temperature and high pressure fluid from the compressor and an external cooling medium (such as, air, water or the like), and the high temperature and high pressure fluid entering the condenser is cooled and condensed into a normal temperature and high pressure fluid; the evaporator, as another heat exchange device, evaporates the fluid from the condenser into a steam fluid, which will absorb heat from an object to be cooled, thereby achieving the purpose of refrigeration. In some examples, a throttling element (for example, a throttle valve or an expansion valve) may be also provided upstream of the evaporator, converts the normal temperature and high pressure fluid from the condenser into a low temperature and low pressure fluid, and feeds the low temperature and low pressure fluid into the evaporator to be evaporated through heat absorption.

During operation of the compressor, if the compressor operates at an overload or a high pressure ratio, a motor or other parts of the compressor will generate significant heat, which will lead to a reduction in efficiency of the compressor and a reduction in reliability and stability of the system. As shown in FIG. 1, the fluid circulation system according to embodiments of the present disclosure further includes a fluid injection control system 100 in order to ensure normal operations of the compressor and the system with the compressor. The fluid injection control system 100 is configured to inject a fluid into the compressor, for example into a suction pipe or a compression chamber of the compressor, so as to reduce the temperature of the motor or other parts of the compressor, thereby the performance of the compressor is adjusted by the fluid injection and the efficiency of the compressor is improved. In the illustrated embodiment, the fluid injection control system 100 will inject a part of the fluid outputted from an outlet of the condenser 2 directly (not through the evaporator) into the compressor 1.

As shown in FIG. 1, the fluid injection control system 100 includes an injection valve or liquid injection valve 101 and a control apparatus 102, the injection valve or liquid injection valve 101 is disposed in a path of the fluid flowing from the outlet of the condenser 2 into the compressor 1, and the control apparatus 102 is configured to control the injection valve or liquid injection valve 101 to inject a cooling fluid of an appropriate amount into the compressor 1 in response to requirement (for example, if the temperature of the fluid outputted from the compressor is too high, or if the motor and other parts of the compressor generate significant heat, or the like). The control apparatus, in response to a power-on state, controls an open degree of the injection valve (including but not limited to, controlling the injection valve to be opened at a controlled open degree, or controlling the injection valve to be closed) so as to control a flow of the fluid injected through the injection valve into the compressor.

In an exemplary embodiment, as shown in FIG. 1, a temperature detector 107 (with reference to FIGS. 2-4) is further arranged at an outlet or downstream of the compressor 1, and the temperature detector 107 may detect a temperature of the fluid flowing out from the outlet of the compressor 1 and send a temperature signal T indicative of the temperature to the control apparatus 102. The control apparatus 102 may determine, based on the temperature signal, whether the compressor 1 is normally operating or is in an overheat state, for example, whether or not the temperature of the fluid outputted from compressor 1 is higher than or exceeds a threshold. If the temperature of the fluid outputted from compressor 1 is higher than or exceeds the threshold, the control apparatus 102 controls the injection valve 101 to inject a cooling fluid, such as the fluid coming from the condenser 2 and having a reduced temperature, into the compressor 1.

In the case that the control apparatus 102 is powered off, for example, in the case that an insufficient or reduced voltage is supplied from an external power supply to the control apparatus 102 or that power provided to the control apparatus 102 from the external power supply is interrupted, the control apparatus 102 cannot continue controlling the injection valve or liquid injection valve 101 and the injection valve or liquid injection valve 101 will still be kept at the open degree before the control apparatus is powered off. As a result, the fluid will enter the compressor 1 continuously through the valve 101. In order to enable the control of the injection valve when the control apparatus is powered off, an energy storage apparatus 103 is provided for or combined into the fluid injection control system 100 according to embodiments of the present disclosure, and is configured to supply power to the control apparatus 102 in the case that the control apparatus is powered off, so as to maintain the operation of the control apparatus. The control apparatus can thus keep controlling the operation of the injection valve. In an example, if the control apparatus is powered off from the external power supply and is then supplied with power from the energy storage apparatus instead, the control apparatus controls the injection valve to be closed so as to prevent the fluid from being injected into the compressor through the injection valve. For example, if the control apparatus is powered off from the external power supply and is supplied with power from the energy storage apparatus instead, the control apparatus 102 sends a valve closing signal to close the injection valve 101 so as to prevent the fluid from being injected into the compressor 1 through the injection valve 101. As such, no additional solenoid valve need be provided for cutting off the injection of the fluid into the compressor 1 through the injection valve or liquid injection valve 101.

Figure 2:
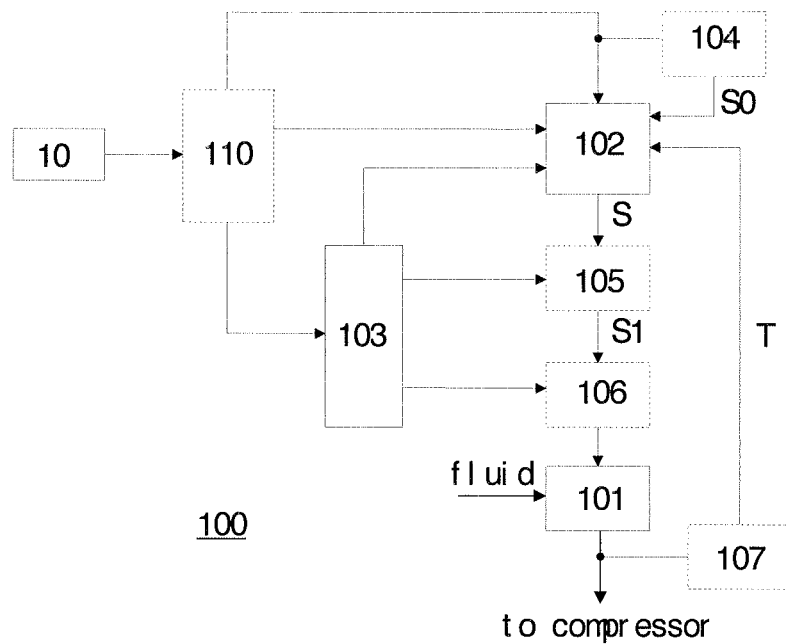
FIG. 2 is a block diagram showing a fluid injection control system according to an exemplary embodiment of the present disclosure.
Figure 3:
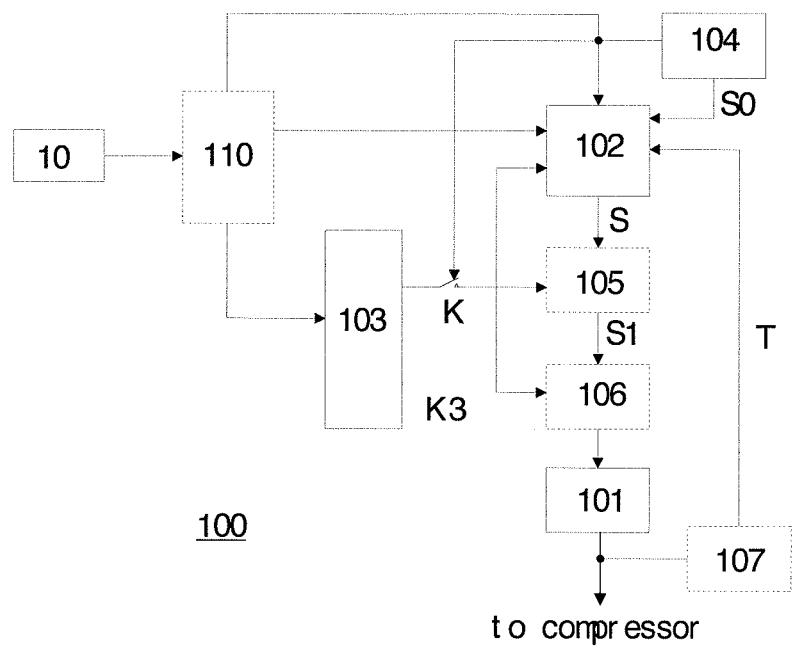
FIG. 3 is a block diagram showing a fluid injection control system according to another exemplary embodiment of the present disclosure.
Figure 4:
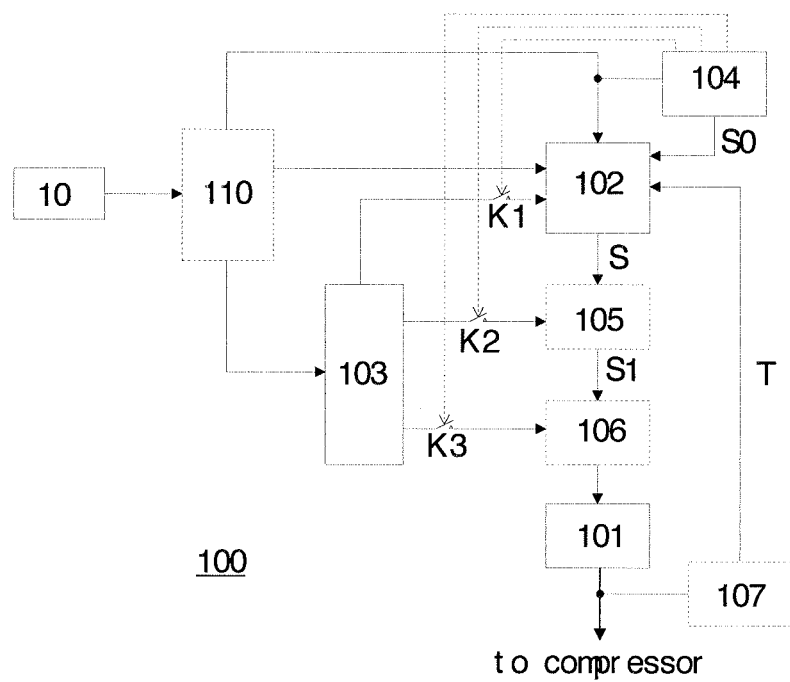
FIG. 4 is a block diagram showing a fluid injection control system according to a further exemplary embodiment of the present disclosure.

In some examples, as shown in FIGS. 1 and 2, the energy storage apparatus 103 is in electrical connection with the control apparatus 102 directly, thereby the energy storage apparatus 103 will supply power to the control apparatus 102 immediately once the control apparatus 102 is powered off due to supply of an insufficient or reduced voltage to the control apparatus from an external power supply or due to interruption of the power provided to the control apparatus from an external power supply. In other some embodiments, the energy storage apparatus 103 can be electrically connected with the control apparatus 102 on demand. For example, as shown in FIG. 3, the energy storage apparatus 103 is electrically connected with the control apparatus 102 via a switch K. Or alternatively, as shown in FIG. 4, the energy storage apparatus 103 is electrically connected with the control apparatus 102 via a first normally-open switch K1, and the switch K1 will be switched on so as to electrically communicate the energy storage apparatus 103 with the control apparatus 102 once the control apparatus 102 is powered off or once it is required to provide the control apparatus with an additional electrical power. "On" or "Off" of the switch may be implemented manually, or may be implemented automatically according to a trigger signal.

FIG. 2 schematically shows a fluid injection control system according to an exemplary embodiment of the present disclosure. As shown in the figure, the fluid injection control system 100 further includes a power-off detection circuit 104 configured to detect a supply power state from an external power supply 10 to the control apparatus 102, and to send a power-off signal S0 to at least the control apparatus 102 once the control apparatus 102 is powered off due to insufficient power supply to the control apparatus from the external power supply 10. As such, the control apparatus 102, which is supplied with power by the energy storage apparatus 103 instead, sends in response to the power-off signal S0 a closing signal to the injection valve 101 in order to close the injection valve 101 so as to prevent or cut off continuous injection of the fluid to the compressor 1 through the injection valve or liquid injection valve 101.

Various circuit configurations or detection devices may be adopted to detect the powered-off state of the control apparatus. For example, a power-off detection circuit may include a transformer coil, a transistor configuration, a trigger, a resistor, an operational amplifier, an optical coupler and the like, and may be arranged in a line for supplying power from the external power supply to the control apparatus or is connected to the line, so as to timely generate and send a power-off signal or a trigger signal, for example, in the form of a single pulse, at least to the control apparatus once the control apparatus 102 is powered off due to an insufficient power supply or reduced voltage to the control apparatus from an external power supply or due to interruption of the power supply to the control apparatus from an external power supply.

In the embodiment shown in FIG. 2, the fluid injection control system 100 may further include a valve drive circuit 105, the valve drive circuit 105 is electrically connected with the control apparatus 102, and is configured to receive a control signal S (for example, a valve closing signal or a valve opening signal) from the control apparatus 102 and to send a drive signal S1 to a valve actuating mechanism 106 according to the control signal S. The valve actuating mechanism 106 is configured to drive, according to the drive signal S1, the injection valve 101 to open at a controlled open degree or to be closed, thereby controlling injection of the fluid into the compressor 1 through the valve 101.

In response to the power-off of the control apparatus 102, the control apparatus 102 is supplied with power by the energy storage apparatus 103 so as to send a valve closing signal to the valve drive circuit 105 according to the power-off signal received from the power-off detection circuit 104. The valve drive circuit 105 drives the injection valve 101 to be closed by means of the valve actuating mechanism 106, thereby timely preventing the fluid from being injected into the compressor 1 through the valve 101. In some examples, the valve actuating mechanism 106 may include a step motor. But the present disclosure is not limited to this, and in other examples, other actuating mechanisms may be used to drive opening or closing of the injection valve.

According to some embodiments of the present disclosure, as shown in FIGS. 2-4, the energy storage apparatus 103 may be further electrically connected with the valve drive circuit 105 and/or the valve actuating mechanism 106, so as to supply power to at least one of the valve drive circuit 105 and the valve actuating mechanism 106 in response to the power-off of the control apparatus 102, thereby ensuring that the valve drive circuit 105 and/or the valve actuating mechanism 106 is supplied with an sufficient electric energy to drive the injection valve 101 to be closed.

In the embodiment shown in FIG. 2, the energy storage apparatus 103 is in electrical connection with the control apparatus 102, the valve drive circuit 105 and the valve actuating mechanism 106 directly. Once the control apparatus 102, the valve drive circuit 105 and the valve actuating mechanism 106 are powered off, the energy storage apparatus 103 timely provide them with enough electric energy to cause the injection valve 101 to be closed.

In the embodiment shown in FIG. 3, the energy storage apparatus 103 is electrically connected with the control apparatus 102, the valve drive circuit 105 and the valve actuating mechanism 106 via a switch K. The switch K will be switched on once the control apparatus is powered off, such that the electric energy from the energy storage apparatus 102 will be supplied via the switch K to the control apparatus 102, the valve drive circuit 105 and/or the valve actuating mechanism 106. As shown in FIG. 3, the switch K may be electrically connected in a path from the external power supply to the control apparatus. Exemplarily, the switch K may include a diode such as a backward diode, or include a MOS transistor such as a PMOS transistor. Once the control apparatus is powered off, for example, once the voltage supplied to the control apparatus from the external power supply is reduced to a value below a normal operating voltage, the switch K mentioned above is switched on, thereby the energy storage apparatus starts to supply power to the control apparatus, the valve drive circuit and/or the valve actuating mechanism.

In the embodiment shown in FIG. 4, the energy storage apparatus 103 is electrically connected with the control apparatus 102 via a first normally-open switch K1, is electrically connected with the valve drive circuit 105 via a second normally-open switch K2, and is electrically connected with the valve actuating mechanism 106 via a third normally-open switch K3. "On" or "Off" of the switches K1, K2, K3 may be implemented manually, or may be implemented automatically according to a corresponding trigger signal received. For example, the trigger signal may be from the power-off detection circuit 104, the control apparatus 102 or other trigger mechanism. Exemplarily, in the case that power supply from the external power supply 10 to the control apparatus 102 is off, the power-off detection circuit 104, in addition to sending the power-off signal S0 to the control apparatus 102, will send corresponding trigger signals to the switches K1, K2, K3 such that these switched are automatically closed or switched on so as to electrically communicate the energy storage apparatus 103 with the control apparatus 102, the valve drive circuit 105 and the valve actuating mechanism 106. Alternatively or additionally, the power-off detection circuit or the control apparatus may provide a power-off prompt to an operator, so that the operator can be informed of power-off state of the control apparatus or can take corresponding actions In another embodiment, the energy storage apparatus 103 may also be electrically connected directly or indirectly with the power-off detection circuit 104 so as to supply power for the power-off detection circuit 104 in the above power-off situations, thereby ensuring that the power-off detection circuit 104 may provide the power-off signal or trigger signal continuously or at least within a period of time. In other embodiments, the power-off detection circuit 104 may also detect whether the power from the external power supply 10 to the control apparatus 102 recovers or not, and may send a signal to the control apparatus 102 if the power supply recovers. The control apparatus 102 may recover and continue to control the fluid injection into the compressor 1 through the injection valve 101. In addition, when the power supply recovers, the switches K1, K2, K3 may be switched off manually, or nay be switched off automatically once the power-off detection circuit 104 sends these switches an "off" trigger signal. Similarly, the above switch K may be automatically switched off or cut off. The power supply from the energy storage apparatus to the control apparatus may be thus cut off.

In the embodiments shown in FIGS. 2-4, a power converter circuit 110 may also be provided for converting the voltage from the external power supply 10 into a voltage suitable for the control apparatus 102, the valve drive circuit 105, the valve actuating mechanism 106 and/or the power-off detection circuit 104.

In some embodiments, as shown in FIGS. 2-4, the energy storage apparatus 103 may be electrically connected (for example, via the power converter circuit 110) with the external power supply 10 that supplies power to the control apparatus 102. In other embodiments, the energy storage apparatus may be also electrically connected with another power supply device or system, such that sufficient electric energy may be stored in the energy storage apparatus when the control apparatus is not powered off. Thereby, when the above power-off state occurs, the energy storage apparatus can supply enough electric energy to the control apparatus, the valve drive circuit, the valve actuating mechanism and/or the power-off detection circuit, in order to enable closing of the injection valve. Exemplarily, the energy storage apparatus may include a super capacitor or a rechargeable battery.

According to some embodiments of the present disclosure, one or both of the energy storage apparatus and the power-off detection circuit may be integrated or combined into a same or single controller, for example, integrated on a same circuit board, so as to provide an integrated liquid injection controller. As such, the integrated liquid injection controller can control injection or flow of the fluid into the device such as the compressor, and when the supply of power from the external power supply to the controller is off, the energy storage apparatus integrated on the controller may continue to supply power to the controller such that the controller controls the liquid injection valve to be closed and thus prevent the fluid from keeping flowing to the device. In other some embodiment, the energy storage apparatus may be externally connected to a control apparatus, which may include a processor such as a MCU. Further, the power converter circuit, the valve drive circuit or the like may be also integrated or combined, together with the control apparatus, into a same or single controller.

Figure 5:
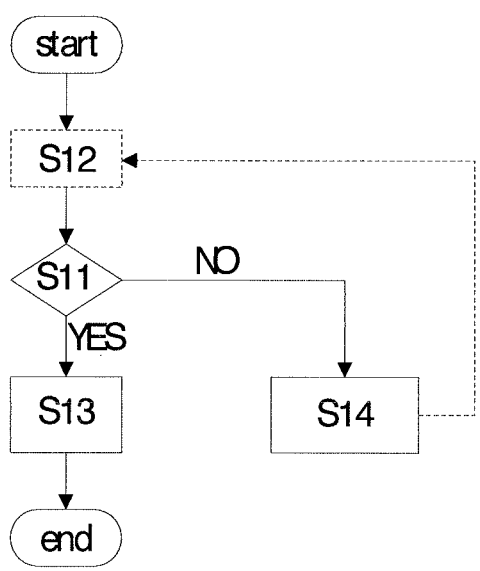
FIG. 5 is a flow chart showing a fluid injection control method according to an exemplary embodiment of the present disclosure.

An embodiment of the present disclosure further provides a fluid injection control method, which may control injection or flow of the fluid into the device by using the fluid injection control system provided in any of the above-described embodiments. As shown in FIG. 5, the method may include Step S11: determining whether supply of power from the external power supply to the control apparatus is off. The method may further include Step S12, in which the power-off detection circuit may detect the state of the supply of power to the control apparatus from the external power supply to determine whether the control apparatus is powered off according to the detected state, as described above. If it is determined that the control apparatus is powered off, Step S13 is proceeded, that is, the energy storage apparatus supplies power to the control apparatus, such that the control apparatus controls the injection valve to be closed so as to prevent the fluid from being injected into the device through the injection valve. If it is determined that the control apparatus is not powered off, Step S14 is proceeded, that is, the control apparatus normally controls opening or closing of the injection valve as required so as to control the fluid to be injected into the device through the injection valve, and meanwhile, the power-off detection circuit may continuously detect the state of the supply of power from the external power supply to the control apparatus in Step S12 so as to timely determine whether the control apparatus is powered off.

Although the present disclosure has been described with reference to the accompanying drawings, the embodiments disclosed in the attached drawings are intended to illustrate the embodiment of the disclosure and should not be construed as being limitative to the disclosure. Sizes and proportions in the figures are only illustrative and should not be construed as being limitative to the disclosure.

Although some embodiments of the general concept of the disclosure have been described and illustrated with reference to the accompanying drawings, it would be appreciated by those skilled in the art various changes or modifications may be made to these embodiments without departing from principle and spirit of the disclosure. The scope of the present invention is solely defined by claims and their equivalents.

What is claimed is:

1. A fluid injection control system, comprising an injection valve, control apparatus and energy storage apparatus; wherein
   the injection valve is arranged in a path along which a fluid flows into a compressor,
   the energy storage apparatus is configured to, in response that the control apparatus is powered off, supply power to the control apparatus to maintain an operation of the control apparatus, and
   the control apparatus is configured to, in response that the control apparatus is powered off, control the injection valve to be closed so as to prevent the fluid from being injected into the compressor through the injection valve, and wherein the compressor is powered off when the control apparatus is powered off.

2. The fluid injection control system of claim 1, wherein, the control apparatus is further configured to control, in a power-on state of the control apparatus, an open degree of the injection valve so as to control flow of the fluid injected into the compressor through the injection valve.

3. The fluid injection control system of claim 1, further comprising:
   a power-off detection circuit, configured to detect a state of supply of power from an external power supply to the control apparatus, and to send a power-off signal to the control apparatus in response that the supply of power from the external power supply to the control apparatus is off.

4. The fluid injection control system of claim 3, further comprising:
   a valve drive circuit, configured to control an open degree of the injection valve,
   wherein the control apparatus is further configured to send, in response to receiving the power-off signal, a valve closing signal to the valve drive circuit such that the valve drive circuit drives the injection valve to be closed.

5. The fluid injection control system of claim 4, wherein, the valve drive circuit is configured to control a valve actuating mechanism to drive the injection valve to be opened at a controlled open degree or to drive the injection valve to be closed.

6. The fluid injection control system of claim 5, wherein, the energy storage apparatus is further configured to supply, in response that the control apparatus is powered off, power to at least one of the valve drive circuit and the valve actuating mechanism.

7. The fluid injection control system of claim 1, wherein the energy storage apparatus is electrically connected with an external power supply configured to supply power to the control apparatus.

8. The fluid injection control system of claim 1, wherein the energy storage apparatus comprises a super capacitor or a rechargeable battery.

9. The fluid injection control system of claim 1, wherein the energy storage apparatus is in electrical connection with the control apparatus directly.

10. The fluid injection control system of claim 1, wherein, the energy storage apparatus is electrically connected with the control apparatus via a switch;
    the switch is configured to be switched on in response that the control apparatus is powered off, such that an electric energy from the energy storage apparatus is supplied to the control apparatus through the switch.

11. The fluid injection control system of claim 10, wherein, the switch comprises a diode or a MOS transistor.

12. The fluid injection control system of claim 3, wherein, at least one of the energy storage apparatus and the power-off detection circuit are integrated into the control apparatus.

13. A fluid circulation system comprising the fluid injection control system and the device of claim 1, wherein the fluid injection control system is configured to control injection of the fluid into the compressor.

14. The fluid circulation system of claim 13, wherein,
the fluid circulation system further comprises an evaporator and a condense, the compressor, the condenser and the evaporator being in a fluid communication with one another in sequence through a pipe and forming a fluid circulation loop, and
the injection valve is arranged in a path of the fluid flowing from an outlet of the condenser to the compressor.

15. The fluid circulation system of claim 13, wherein, the fluid circulation system further comprises a temperature detector configured to detect a temperature of the fluid flowing out from an outlet of the compressor and to send a temperature signal indicative of the temperature to the control apparatus, and
the control apparatus is further configured to determine whether t the temperature of the fluid flowing out from the outlet of the compressor exceeds a threshold based on the temperature signal, and to control, in response to the temperature exceeding the threshold, the injection valve to inject a fluid into the compressor to reduce the temperature of the fluid flowing out from the outlet of the compressor.

16. A fluid injection control method, comprising:
controlling injection of fluid into a compressor by using the fluid injection control system of claim 1.

17. The fluid injection control method of claim 16, wherein said controlling the injection of the fluid into the compressor by using the fluid injection control system comprises:
detecting a state of supply of power from an external power supply to the control apparatus;
determining whether the control apparatus is powered off according to the detected state; and
supplying power by the energy storage apparatus to the control apparatus in response to the control apparatus being powered off, and controlling by the control apparatus the injection valve to be closed so as to prevent the fluid from being injected into the compressor through the injection valve.

18. The fluid injection control system of claim 1, wherein the system excludes an additional solenoid valve.

19. The fluid injection control system of claim 18, wherein the injection valve excludes a solenoid valve.

20. The fluid injection control system of claim 18, wherein the injection valve is a stepper-motor valve.

* * * * *